(12) United States Patent
Daniels et al.

(10) Patent No.: US 6,230,700 B1
(45) Date of Patent: May 15, 2001

(54) CHARCOAL GRILL

(76) Inventors: James W. Daniels, 1528 Cresthill Rd., Birmingham, AL (US) 35213; Dale T. Daniels, 17230 Oleander La., Sugar Loaf Key, FL (US) 33042

(*) Notice: Subject to any disclaimer, the term of this patent is extended or adjusted under 35 U.S.C. 154(b) by 0 days.

(21) Appl. No.: 09/229,974

(22) Filed: Jan. 14, 1999

Related U.S. Application Data (60) Provisional application No. 60/071,738, filed on Jan. 16, 1998.

(51) Int. Cl.[7] .................................................. A47J 37/00
(52) U.S. Cl. .................. 126/25 R; 126/25 A; 126/21 R; 126/21 A; 99/447
(58) Field of Search ............................. 126/25 R, 41 R, 126/41 D, 26, 25 A, 21 R, 21 A, 15 R, 15 A; 99/447, 400

(56) References Cited

U.S. PATENT DOCUMENTS

| | | |
|---|---|---|
| 2,048,769 | 7/1936 | Anderson . |
| 2,201,756 | 5/1940 | Avetta . |
| 2,335,217 * | 11/1943 | Tate ........................................ 126/14 |
| 2,441,190 | 5/1948 | Fuller . |
| 2,666,426 * | 1/1954 | Pollard ............................... 126/25 R |
| 2,821,187 | 1/1958 | Tescula . |
| 2,850,991 * | 9/1958 | Thompson ....................... 126/299 R |
| 2,923,229 | 2/1960 | Halford . |
| 2,946,275 * | 7/1960 | Compton .............................. 99/400 |
| 3,025,784 | 3/1962 | Williams . |
| 3,347,220 | 10/1967 | Barbera . |
| 3,742,838 | 7/1973 | Luschen . |
| 3,933,145 * | 1/1976 | Reich .................................. 126/25 R |
| 3,982,522 | 9/1976 | Hottenroth et al. . |
| 4,090,490 * | 5/1978 | Riley et al. ......................... 126/25 R |
| 4,120,237 | 10/1978 | Mecherlen . |
| 4,418,678 * | 12/1983 | Erickson ............................ 126/25 R |
| 4,788,906 * | 12/1988 | Starks ................................. 126/25 R |
| 4,850,333 | 7/1989 | Dellrud et al. . |
| 5,287,253 | 2/1994 | Blorstad . |
| 5,718,165 * | 2/1998 | Winstead .............................. 99/400 |
| 5,782,166 * | 7/1998 | Lin .................................... 126/25 R |
| 5,996,573 * | 12/1999 | Ganard et al. ..................... 126/25 R |

* cited by examiner

*Primary Examiner*—Carl D. Price
*Assistant Examiner*—David Lee
(74) *Attorney, Agent, or Firm*—Handal & Morofsky

(57) ABSTRACT

An off fire cooling system having an octagonal body shape and split fire system which doubles the coal heating surface area and doubles the coal heat output. The cooking system also has an air introduction system which circulates air throughout the interior of the grill to maintain an optimum cooking temperature. The octagonal maintains the cooking temperature at or above 400 degrees Fahrenheit in the center of the grilling system. The system eliminates grease fires and smoke associated with grease fire flare ups. The charcoal and food products are suspended for optimum cooking while preventing grease from falling onto the burning charcoal coals.

2 Claims, 9 Drawing Sheets

CHARCOAL GRILL

This application claims the benefit of Provisional No. 60/071,738 filed Jan. 16, 1998.

The present invention relates to an off fire charcoal grill having an octagonal shape and air introduction system which maintains an ambient cooking temperature in excess of 400 degrees Fahrenheit.

BACKGROUND

Outdoor barbecue grilling has been acknowledged as one of the great American pastimes and is mentioned in the same breath as, baseball, hot dogs and apple pie. Due to its popularity and extent of use, outdoor barbecue grilling has evolved throughout the years in attempts to address common problems encountered while barbecue grilling.

For instance, traditional charcoal grilling includes the use of a plurality of charcoal briquets which must be ignited with flammable lighter fluid. However, it is well known that a charcoal coal fire is sometimes hottest at its center while the periphery of the charcoal coal fire has a cooler temperature. Thus, timing of the placement of the meat on the fire is essential. The barbecue chef must use discretion when placing the food to be cooked onto the grill, for if the placement is too early, the meat may be charred and if the placement is too late, there may not be enough of a sufficient coal fire to complete the cooking of the meat, nor may there be a high enough temperature to kill any existing bacteria in the meat. In addition, if the meat is placed onto the grill prior to the complete burning off of the lighter fluid, the meat's taste could be adversely affected. Moreover, early types of lighter fluid and its volatile characteristics sometimes created a dangerous combination.

Various improvements have included gel type lighter fluids that did not flare up when ignited. In addition, the charcoal itself was manufactured to include such a flammable material so that a user needs only to strike a match to prepare the charcoal.

However, these improvements failed to correct the uneven cooling temperatures and short life span of an optimum cooking temperature produced by the burning coals. Moreover, as the meats are placed over burning coals the grease droppings associated with the cooking of such meats causes the coals to flare up back toward the meat. This flare up causes charring of the exterior of the meat and may ultimately ruin a meal. In addition, the smoke caused by such a flare of also affects the taste of the meat.

Other attempts to correct these problems included the advent of propane gas barbecue grills. However, such grills cannot duplicate the culinary satisfaction of an open fire barbecue grilling of a meal.

In addition, recent studies conducted by the MAYO clinic and the American Cancer Society have produced results which indicate that individuals who barbecue their foods, in particular meats, three or more times a month for a five-year period placed those people in a higher percentile for susceptibility to particular types of cancer.

Some of the suggestions from these studies to reduce such risks are the following, use of a high temperature to eliminate bacteria, reduce "flare up" caused by grease dripping from the cooking meats and avoid charring of the meat. Some of these studies also indicated that carcinogenic toxins are built up in the meats being cooked due to "flare up" and charring of the meat.

SUMMARY OF THE INVENTION

The present invention relates to outdoor equipment, and pertains more particularly to an improved charcoal grill. The present invention is directed to a barbeque grill which cooks food products in an off fire cooking system. The present invention provides a split fire system which doubles the coal heating surface area and double the coal heat output. The grilling system also has an air introduction system which circulates air throughout the interior of the grill to maintain an optimum cooking temperature. Moreover, the grill body is octagonal in shape. The octagonal shape also maintains the cooking temperature at or above 400 degrees Fahrenheit in the center of the grilling system.

It is one object of the present invention to provide a barbecue grill that will assist in the reduction of health risks associated with barbeque grilling. The present invention provides a barbeque grill that eliminates grease fires and smoke associated with grease fire flare ups. The charcoal is suspended in such a manner as to prevent the cooking grease from falling onto the burning charcoal coals.

It is another object of the present invention to provide a grill that will cook meat with a high enough temperature to kill any existing bacteria in the meat. It is also another object of the present invention to prevent "Flare-up," caused by greases dripping from the meats as they are cooling in the grill. In addition, the prevention of a flare-up will prevent smoke from the burning grease to the affect the flavor of the meat being cooked. Also, the present invention will prevent the charring of the meat, which can be caused by a direct flame positioned below the meat being cooked.

The present invention accomplishes this by providing a unique off-fire cooking system that suspends the burning coals in the cooking unit to increase the convection within the grill. This is accomplished by splitting the source of fire into two fire baskets which provide even heat and also doubles the heating surface area provided by the coals.

A blower unit is also used to introduce a steady stream of air to keep the coals burning at a peak temperature. This system will provide a cooking unit that provides temperature is consistently at a temperature in excess of 400 degrees Fahrenheit. This will allow meat to be cooked without charring and sealing in the natural juices of the meat to provide an enhanced outdoor cooking experience.

Thus, the present invention provides a grilling system that reduces health risks associated with barbeque grilling without losing or adversely affecting the barbeque flavors associated with barbeque grilling.

BRIEF DESCRIPTION OF THE DRAWINGS

One way of carrying out the invention is described in detail below with reference to drawings which illustrate a specific embodiment of the invention.

DETAILED DESCRIPTION OF THE PREFERRED EMBODIMENTS

Figure 1:
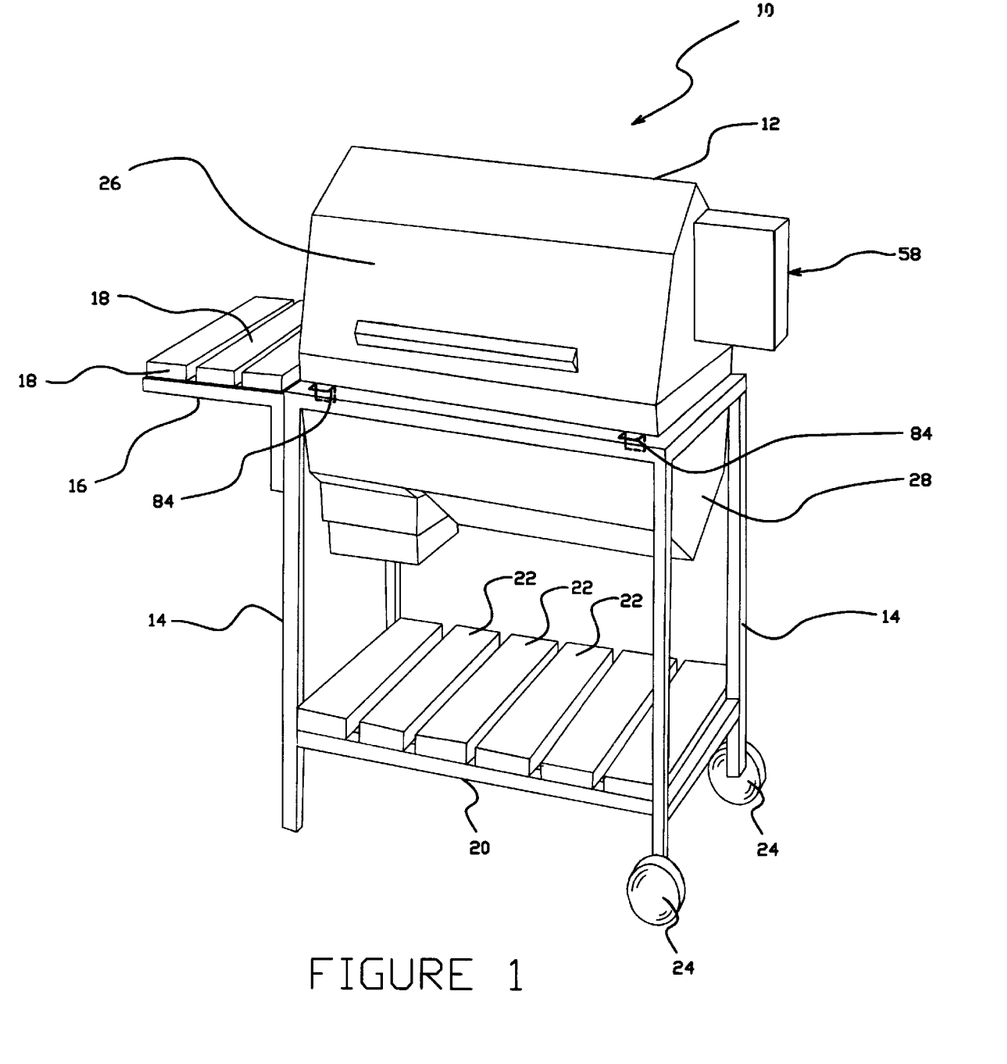
FIG. 1 is a front perspective view of the present invention.

Turning now to FIG. 1, a barbeque grill 10 constructed in accordance with the present invention is illustrated. Grill 10 is constructed out of a heat resistant material, such as cast aluminum, galvanized aluminum, steel, stainless steel or cast iron, which is durable, lightweight and resistant to high temperatures and weathering. This is of particular importance due to grill 10 constant exposure to the elements.

Grill 10 comprises a body 12. Body 12 is supported by a frame 14. Frame 14 has an extended shelf portion 16 which is secured to one side of frame 14. Shelf portion 16 has a plurality of wood planks 18 mounted to shelf portion 16 to provide a staging area for food products to be cooked by grill 10. In addition, condiments and utensils may also be placed on this staging area in preparation for grilling.

The positioning of shelf portion 16 is so that the staging area is positioned to coincide with the grill. Alternatively, shelf portion 16 may be positioned on both sides of grill 10 or in front of grill 10.

Frame 14 also has a lower shelf portion 20. Lower shelf portion 20 is positioned below body portion 12 and is mounted to frame 14 to provide an additional storage space for items. In addition, shelf portion 20 provides stability to frame 14. A plurality of wood planks 22 are also mounted to shelf portion 20 to provide for this storage area.

Planks 18 and 22 are preferably a weather resistant type of wood such as redwood. Alternatively, planks 18 and 22 may be molded out of a durable material such as plastic.

To facilitate the movement of grill 10, a pair of wheels 24 are mounted to the bottom legs of frame 14. Thus, a user need only lift the portion of frame 14 that has no wheels attached to it to move grill 10. In the preferred embodiment, shelf portion 16 is positioned to also act as a handle to facilitate the movement of grill 10. Moreover, the extension of shelf 16 away from grill 10 minimizes the amount of force required to lift frame 14.

Wheels 24 are constructed out of a durable material such as plastic or rubber. In addition, the remaining two legs of frame 14 do not have wheels mounted on them. This feature prevents un-wanted movement of grill 10.

Figure 2:
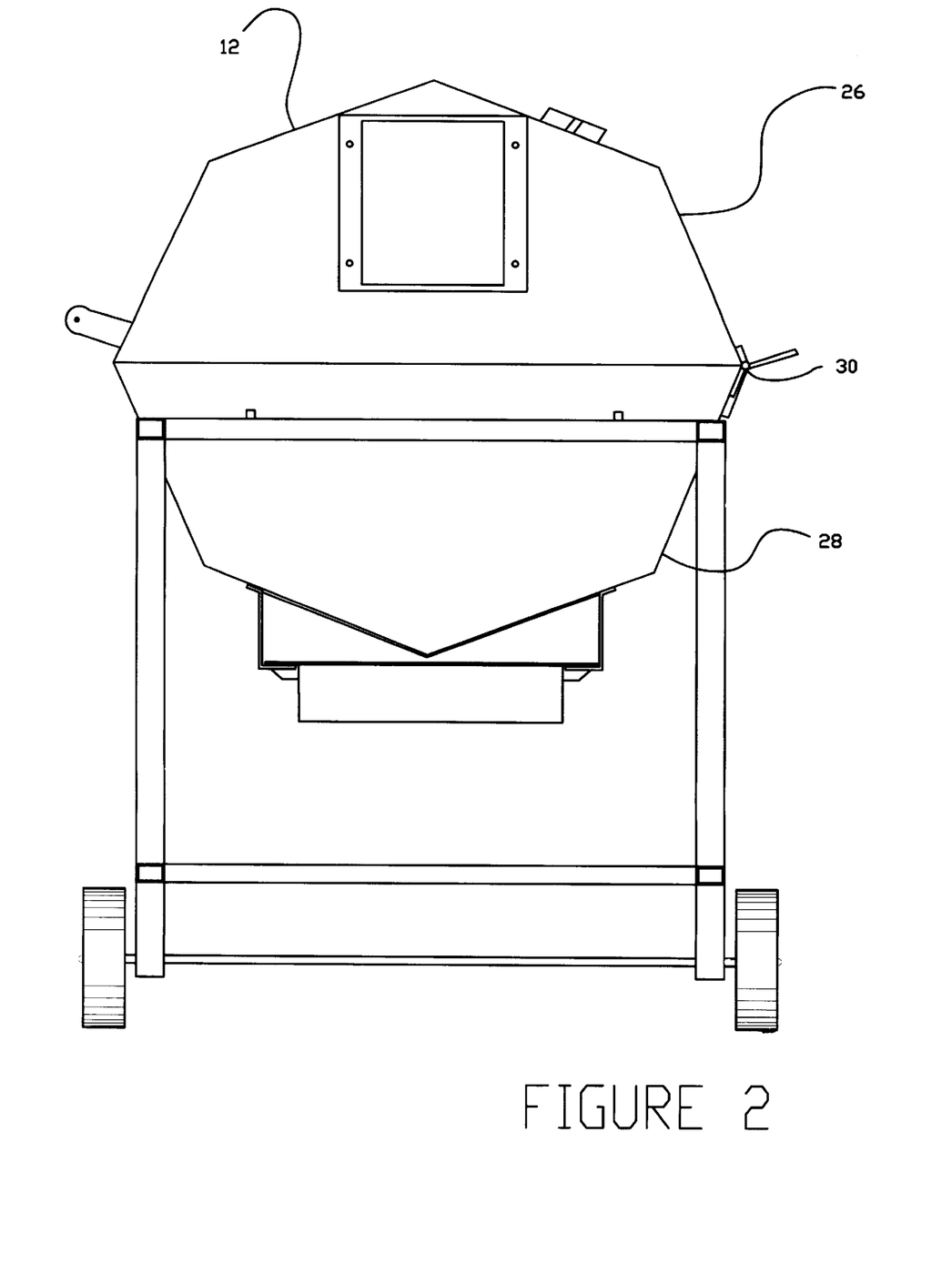
FIG. 2 is a side elevation view of the present invention.

Body portion 12 is configured and dimensioned to define an elongated body having and an octagonal shape. This shape is particularly viewed when body portion 12 is viewed from its side (as illustrated in FIG. 2). As an alternative, body portion 12 may be configured to have a hexagonal, polygonal, rectangularly arranged, trapezoidal, cubic or any other similarly shaped arrangement.

Figure 3:
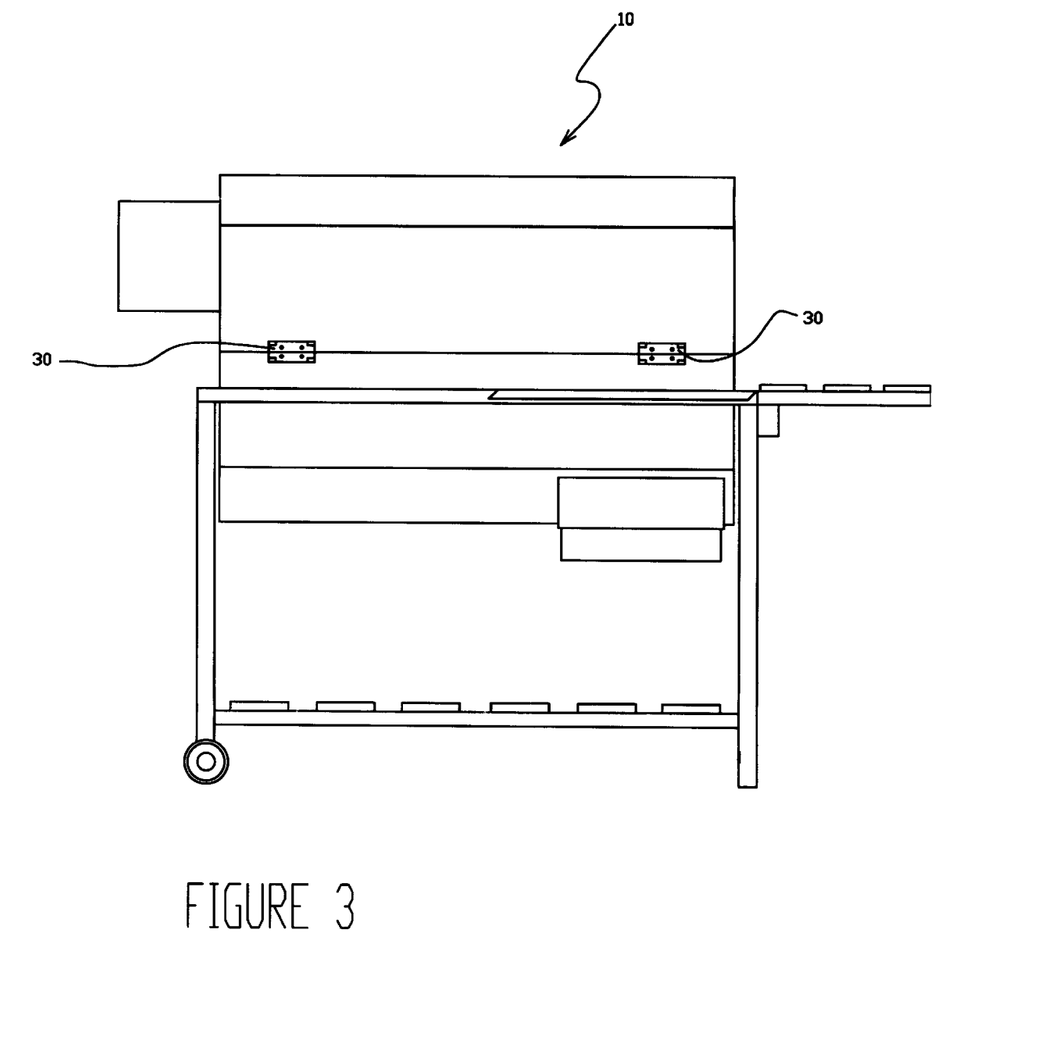
FIG. 3 is a rear elevation view of the present invention.

Referring now to FIG. 2, body portion 12 has an upper body portion 26 and a lower body portion 28. Portions 26 and 28 are pivotally connected along their elongated sides by a pair of hinges 30 (as illustrated in FIG. 3).

Referring-back now to FIG. 2, body portion 26 comprises one half of the octagonal shape defined by body 12. Similarly, body portion 28 defines the other half of the octagonal shape defined by body 12 or more particularly the lower portion.

Figure 4:
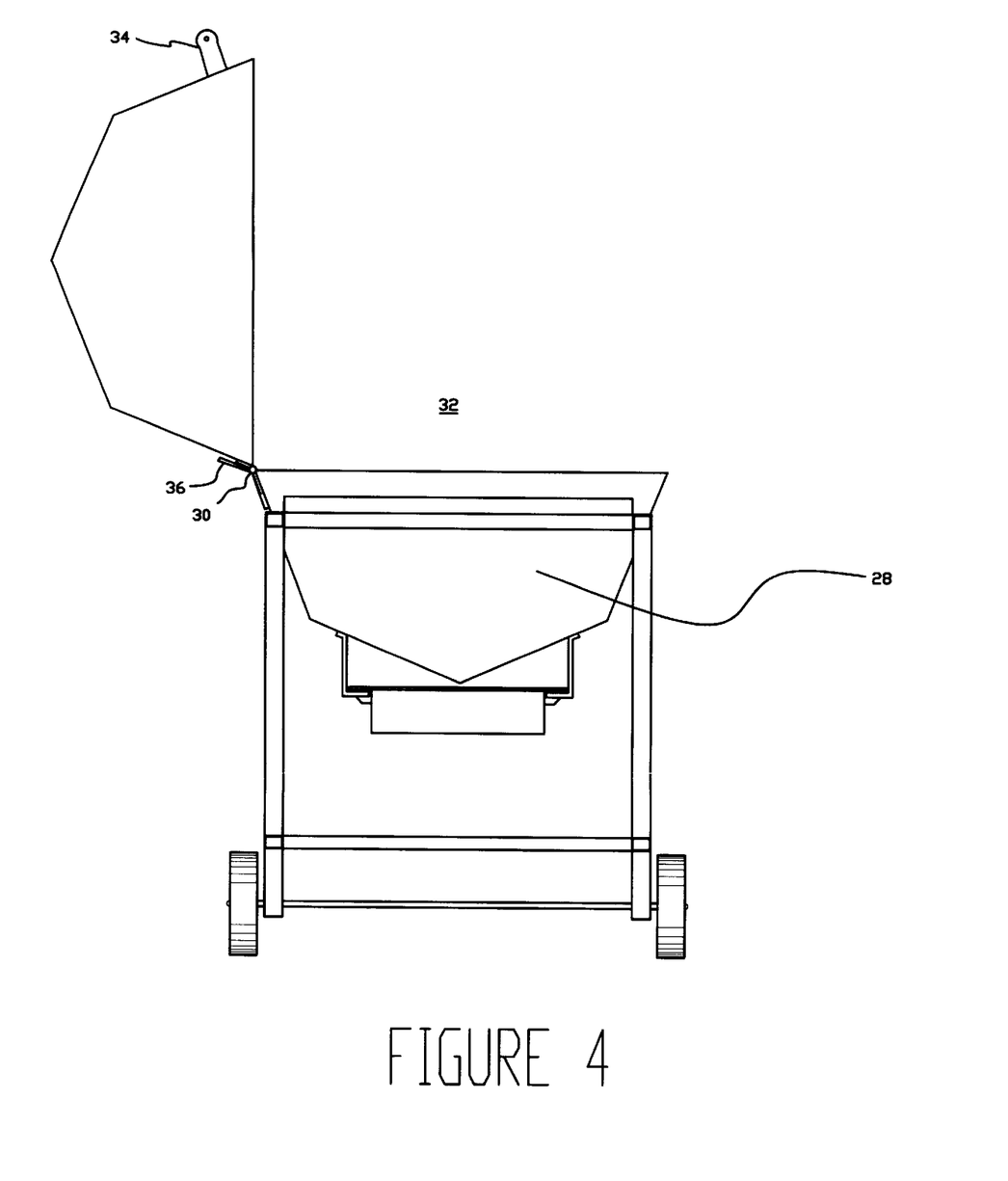
FIG. 4 is a side view illustrating functional components of the present invention.

Referring now to FIG. 4, portions 26 and 28 are also configured to define an inner cavity 32. Inner cavity 32 is positioned within body 12. Hinge 30 allows for the pivotal movement of portion 26 with regard to portion 28 to allow access for the user into inner cavity 32 (as illustrated in FIG. 4).

A handle 34 is mounted to the outer surface of portion 26. Handle 34 allows a user to grip the handle and pivot portion 26 away from portion 28 to allow for access into inner cavity 32. A support bar 36 limits the pivot of portion 26 away from portion 28.

Figures 5, 11:
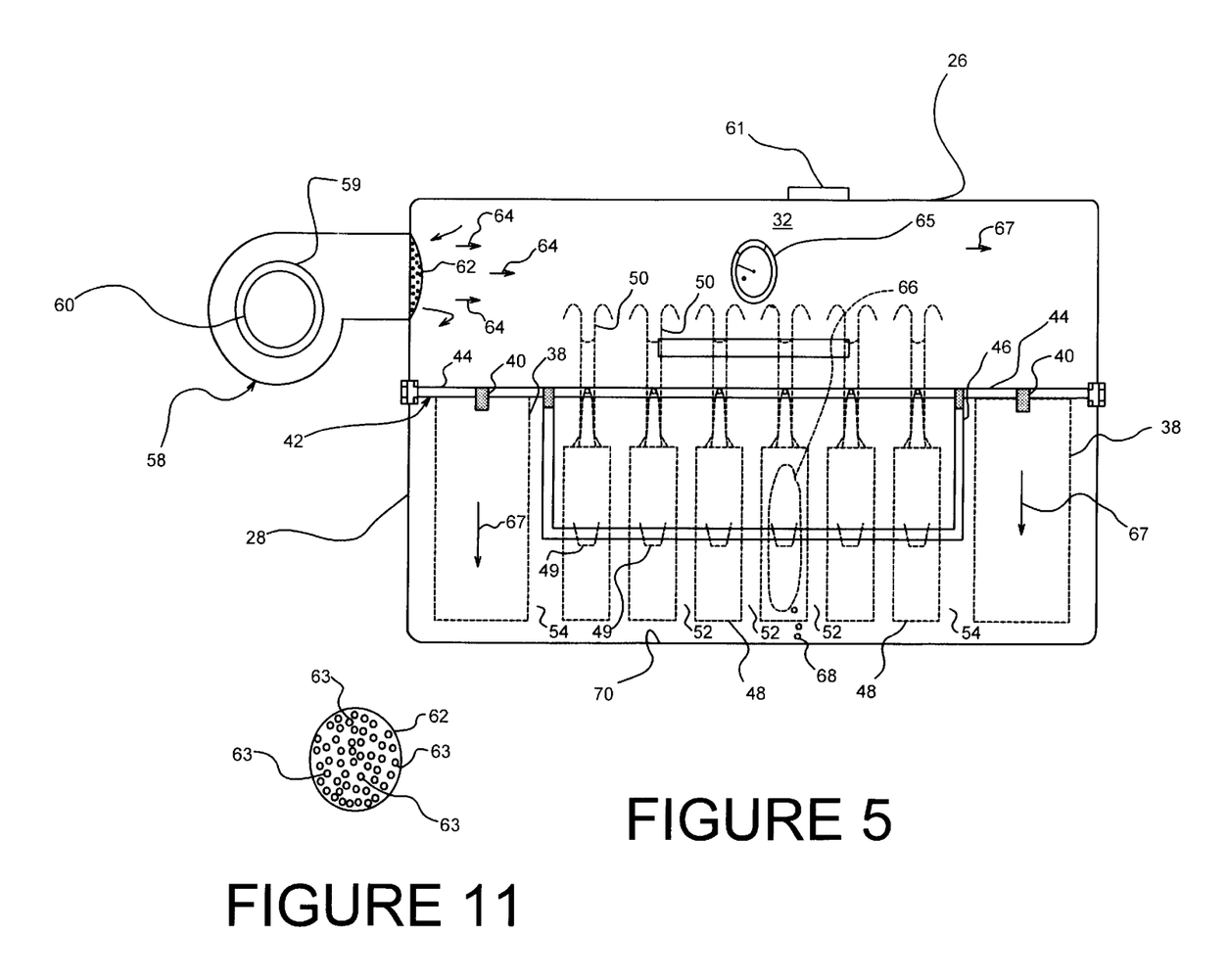
FIG. 5 is a front plane view illustrating the grilling components of the present invention.
FIG. 11 is a front plane view illustrating an a component of the present invention.

Turning now to FIG. 5, the details of inner cavity 32 are illustrated. Lower body portion 28 supports portions of the grilling system. A pair of Charcoal baskets 38 are positioned to hang at either end of inner cavity 32 as defined by lower body portion 28.

In the preferred embodiment, charcoal baskets 38 are constructed out of a steel diamond mesh to define charcoal baskets 38. In the preferred embodiment charcoal baskets 38 have the following dimensions 4"×9"×12" and are manufactured out of an expanded metal mesh with a plurality of holes. The plurality of holes allows for a uniform burning of the charcoal briquets. The holes of the bottom portion of baskets 38 are of a size large enough to allow for heat convection and burning while being small enough to keep ashes from the burnt coals dropping through the bottom of basket 38.

Figure 6:
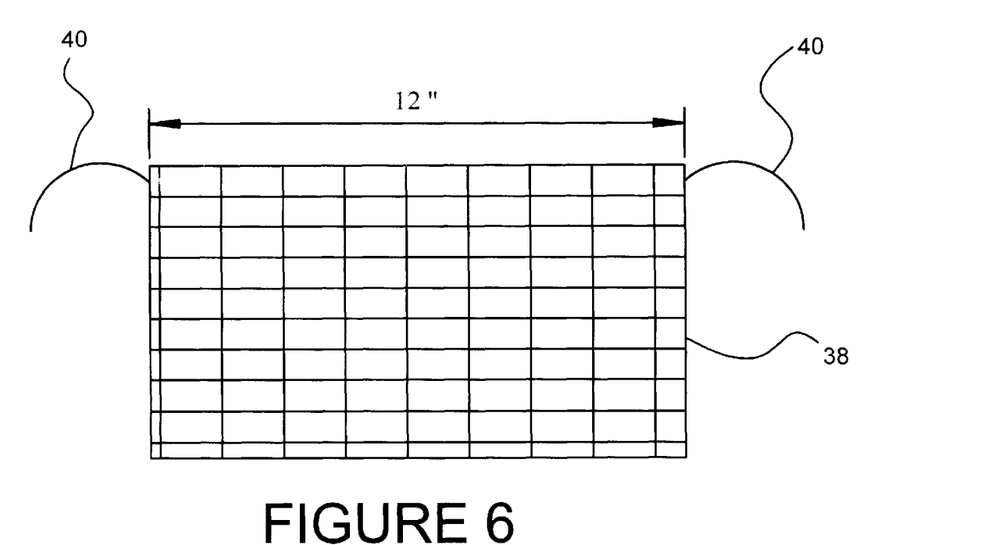
FIG. 6 is a side view of the charcoal carrying baskets of the present invention.
Figure 7:
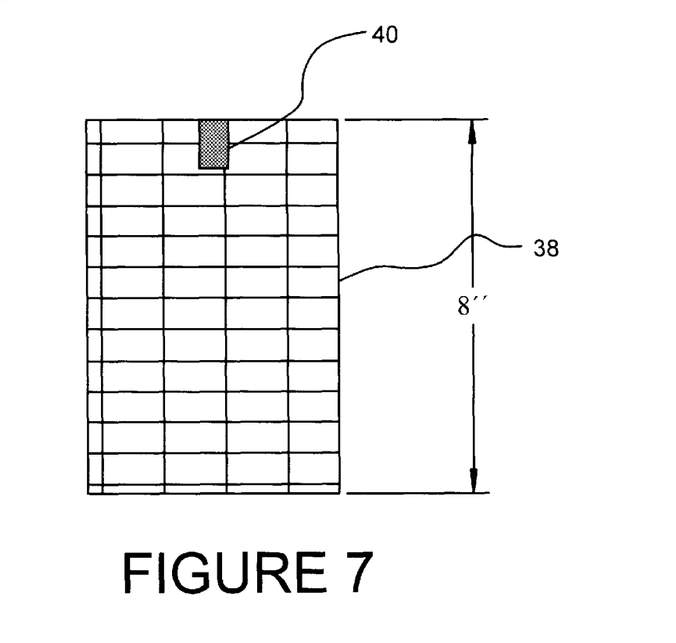
FIG. 7 is a view along lines 7—7 of FIG. 6.

Referring now to FIGS. 5, 6 and 7, baskets 38 have a pair of hanging arms 40 which are positioned and connected to either side of baskets 38. Moreover, baskets 38 are configured to have an opening at the top for placement of charcoal into basket 38.

Arms 40 support baskets 38 from a support frame 42 which has a pair of support bars 44. Bars 44 are affixed to the inner surface of lower portion 28 and run along the elongated portion of inner cavity 32 which is defined by lower body portion 28.

An inner frame 46 is affixed to frame 42. Inner frame 46 is configured to receive and support a plurality of inside cooking racks 48 at a midpoint along their sides. Inner frame 46 is configured to have its supporting structure approximately 8' from the top lip of lower portion 28. In addition, inner frame 42, bars 44 and inner frame 46 are positioned to support cooling rack 48 and baskets 38.

Cooking racks 48 are positioned in between charcoal baskets 38 so that they may receive the radiant heat given off from charcoal coals burning within baskets 38.

Cooking racks 48 are also configured to have an opening at their top. The opening allows for the user to place food products within rack 48. In the preferred embodiment, six cooking racks 48 are positioned in between charcoal baskets 28.

Figure 8:
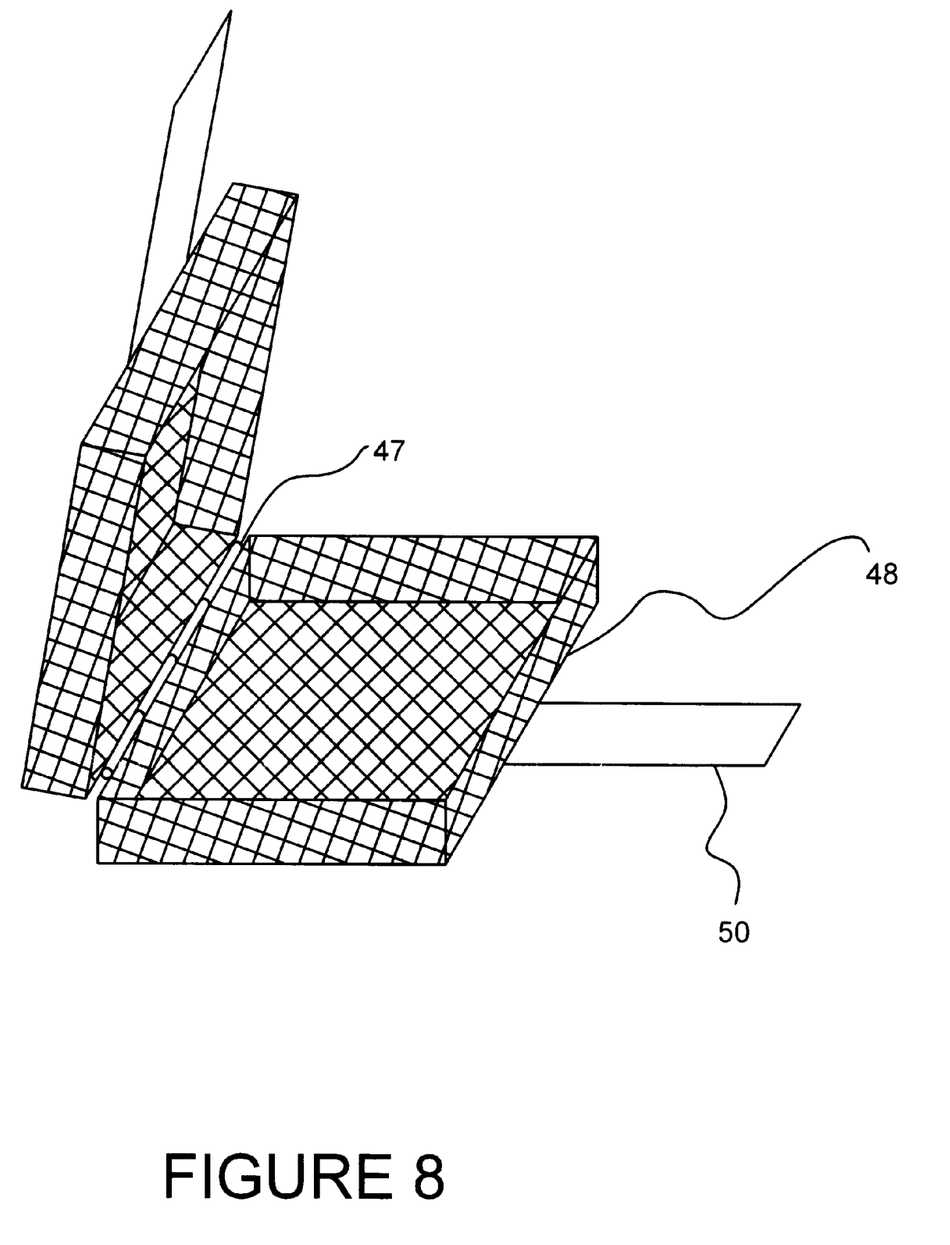
FIG. 8 is a perspective view of an alternative components of the present invention.

As an alternative and referring to FIG. 8, racks 48 can be configured to define a pair of mesh boxes pivotally connected by a hinge 47 for pivotally connecting either side rack 48 with respect to each other. Hinge 47 would allow a user to open rack 48 and place and/or remove food products.

In yet another variation, rack 48 can be configured to define a basket having one of its side walls pivotally connected to rack 48 to allow a user to open rack 48 to place and/or remove food products. These features would also allow an individual to place rack 48 on a flat surface for ease of placing food products in basket 48. Then rack can be hung as illustrated in FIG. 5.

Cooking racks 48 each have a pair of hanging arm supports 49. Arm supports 49 make contact with frame 46 to support racks 48.

In addition, each of the cooking racks has a handle 50 affixed to them. Handle 50 is positioned to allow for easy removal of racks 48 from frame 46.

Cooking racks 48 are constructed out of a heat resistance material which is resistant to corrosion and will not affect the taste of the food being cooked, such as stainless steel or steel diamond mesh. In addition, racks 48 are also TEFLON coated to prevent the cooking food products from sticking to racks 48.

Racks 48 are also manufactured to have a plurality of holes. The plurality of holes allows for a uniform cooking of food products placed within basket 48.

As can be seen from FIG. 5, the positioning of racks 48 is in a configuration to provide an air gap 52 between each of the racks. An air gap 54 is also present between charcoal baskets 38 and the cooking racks 48 which are positioned in a position closest to charcoal basket 38. These air gaps allow for the radiant heat from the burning charcoal to be circulated throughout inner cavity 32.

Figures 9, 10:
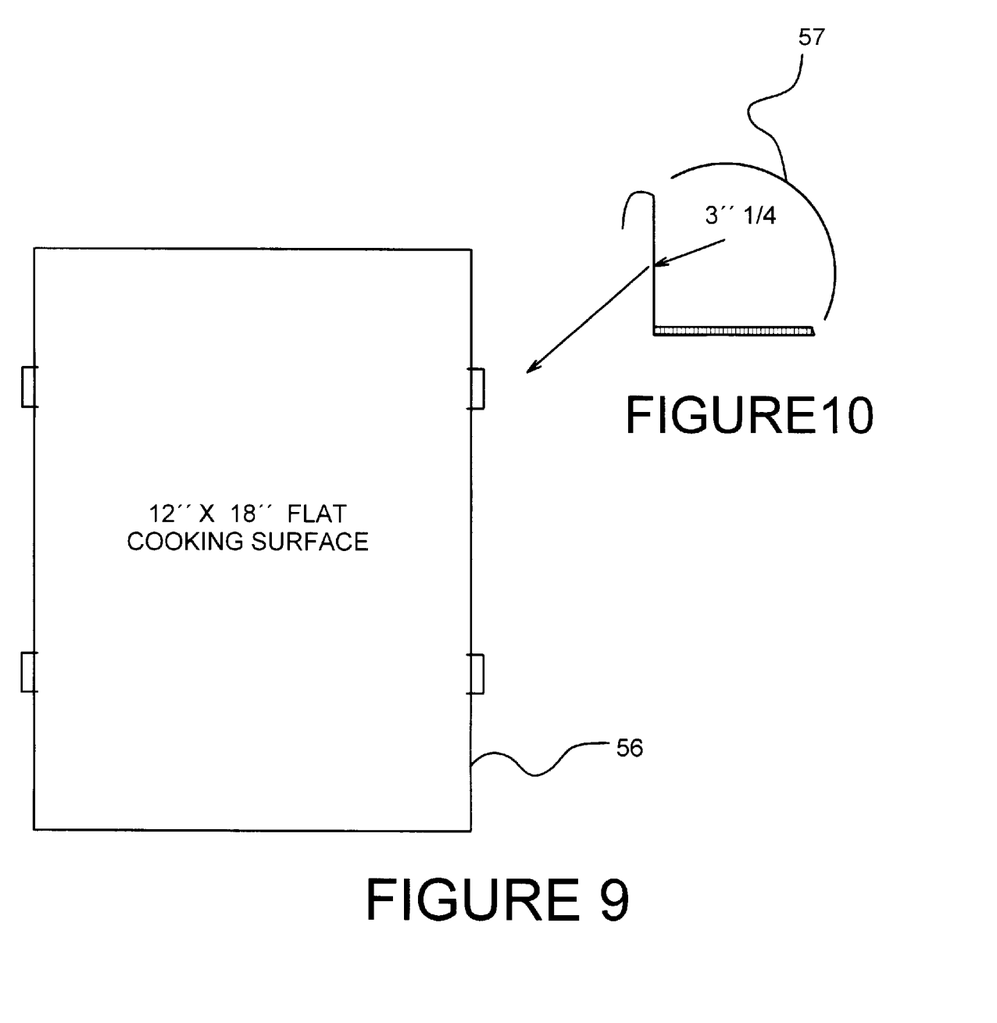
FIG. 9 is a top plane view illustrating an alternative component of the present invention.
FIG. 10 is a side plane view illustrating an alternative component of the present invention.

Referring now to FIGS. 9 and 10 and as an alternative, a flat cooking surface 56 is supported by a plurality of hangers 57 which support surface 56 at a depth of three inches from frame 46. Thus, surface 56 provides a cooking surface with having a height of 11" from the lip of lower body portion 28.

As an alternative, surface 56 may be equipped with adjustable hanger 57 to vary the height of surface 56 with regard to the lip of lower body portion 28. In fact lower body portion may be configured to support surface 56 at its periphery.

In the preferred embodiment, cooking surface 56 comprises a stainless steel or steel grill having a 12"×18 cooking area (as illustrated in FIG. 9) and a TEFLON coated.

Referring back now to FIGS. 1 and 5, an air introduction system 58 is mounted to the outer surface of portion 26. In the preferred embodiment, system 58 is positioned on the opposite side of shelf portion 16 to allows for a user to access the staging area defined by shelf portion 16 without interference from system 58. System 58 has an internal fan 60 which when activated introduces a steady and consistent flow of air into inner cavity 32.

Air is introduced into inner cavity 32 through a hole 61 (not shown) in upper body portion 26. A diffuser 62 (as illustrated in FIG. 11) having a plurality of holes 63 is mounted over hole 61 and to the inner surface of portion 26. When activated fan 60 will introduce air through holes 63 into inner cavity 32 as indicated by arrows 64.

The air current created by fan 60 causes air to travel in the directions of arrows 64. As can be seen, the air first travels across the portion of inner cavity 32 as defined by upper portion 26 and then through charcoal basket 38. This causes the air to be heated and accordingly increases the internal temperature of grill 10.

In addition, as air is introduced in the direction of arrows 64, air flow is created in the direction of arrows 67 causing heated air to make contact with non-heated air being introduced by fan 60. This air flow helps to maintain a uniform temperature within inner cavity 32 and cause the charcoal briquets to burn more efficiently.

Furthermore, the octagonal configuration of grill 10 causes the air flow to be centralized within inner cavity 32, thus, providing an optimum cooking temperature for grilling.

Moreover, gaps 52 and 54 along with the constant air circulation from fan 60 provides for an air introduction and heating system which supplies grill 10 with a uniform ambient cooking temperature. A temperature gage 65 is mounted to the outer surface of upper body portion 26 and having its temperature sensing elements positioned within inner cavity 32.

As an alternative, air introduction system 58 may be equipped with a baffle or cover 59 to cover the inlet port of fan 60 to prevent the introduction of outside air into inner cavity 32. Thus, fan 60 can be used to only circulate the air already heated within cavity 32.

As yet another alternative and in order to supplement the air circulation of inner cavity 32 a variable release vent 61 having the capability of being manipulated by a user to be either in an open position and/or a closed position to allow heated air and/or excess smoke to escape from or remain within inner cavity 32 is positioned on the surface of grill body 12.

Release vent 61 can be positioned to coincide with the air flow created by fan 60 or it can be completely removed from the air flow created by fan 60. Moreover, a plurality of release vents may be positioned on grill body 12 to allow for such positioning.

Figure 12:
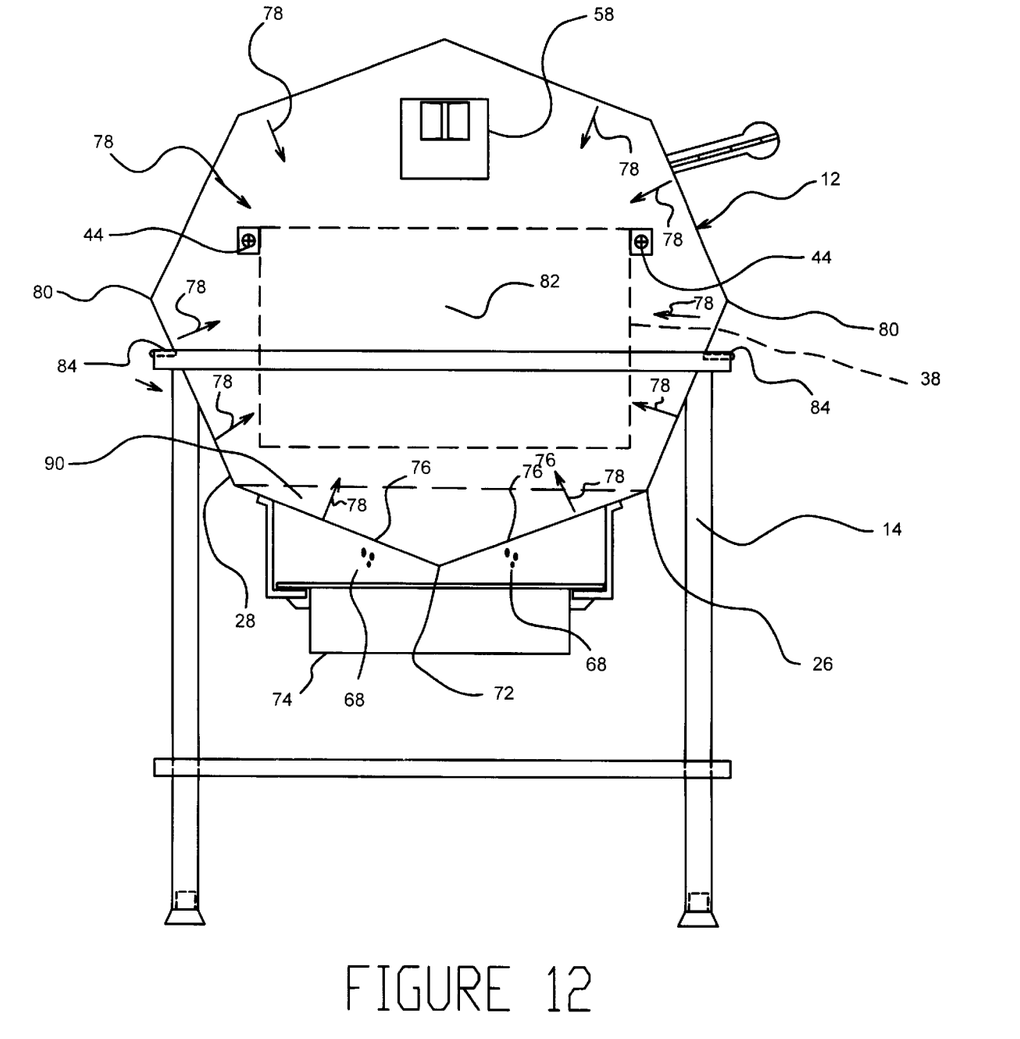
FIG. 12 is a side elevation view illustrating components of the present invention.

The octagonal configuration of grill 10, as illustrated in FIG. 12, also provides for a unique heating convection in the direction of and as illustrated by arrows 78. Accordingly, grill 10 and its octagonal configuration provides for a unique convection heating of the food placed within cooking rack 48.

In addition, since grill 10 is manufactured out of a heat conductive material such as aluminum, the convection of heat in the direction of arrows 78 is also magnified.

As an alternative, body 12 of grill 10 may be made out of a more durable material such as cast iron while the inner surface of lower portion 24 and upper portion 26 may be coated with a heat reflective substance such as aluminum.

Accordingly, the present invention provides a unique off-fire cooking system that maintains a uniform ambient cooking temperature while the same is provided by a charcoal fire which traditionally produces an uneven cooking temperature.

Thus, the constant circulation of air and the octagonal configuration of body 12, causes the inner temperature to be maintained in excess of 400 degrees Fahrenheit.

In addition and referring back now to FIG. 5, as a portion of meat 66 is cooking within cooking basket 48, grease droppings 68 travels in a downward direction toward the lower surface 70 of portion 28.

As illustrated, grease 68 does not make any contact with the coals contained in charcoal baskets 38 and accordingly there is no potential for a grease fire flare-up Referring back now to FIG. 12, lower body portion 28 defines a point 72. Point 72 which is the lowest point of the octagonal shape of body 12. As previously discussed in FIG. 5, as grease 68 drips in a downward direction, caused by gravity, grease 68 will tend to accumulate at the channel defined by lower point 72.

To facilitate the easy removal of grease from grill 10 a grease collecting pan 74 is mounted to portion 28 to coincide with point 72 which is the lowest point of inner cavity 32.

A plurality of holes 76 are positioned in portion 28 to allow grease 68 to travel from inner cavity 32 into grease collection pan 74 for disposal.

The octagonal shape of grill 10 creates a natural point of removal of grease 68 from grill 10.

These droppings will not make contact with the charcoal as in conventional grilling systems. This is of particular importance in that the burning grease from the food products will not be entrained into the air and ultimately into the food being cooked.

Referring in particular to FIG. 12, support bars 44 are positioned so that baskets 38 and racks 48 (not shown) are positioned to hang slightly above upper lip 80 of lower body portion 26. This placement allows for the heated air to travel throughout inner cavity 32. Moreover, this configuration allows for a slightly larger air gap at the top of grill 10 to coincide with the placement of air introduction system 58.

As an alternative, frames 42, 46 and bars 44 may be positioned within lower body portion 28, while the supporting arms 40 and 49 of baskets 38 and racks 48 respectfully, are positioned to maintain baskets and racks accordingly.

In yet another embodiment, baskets 38 and racks 48 may be equipped with adjustable supporting arms to facilitate movement of baskets 38 and racks 48.

As an alternative, support frames 42, 46 and bars 44 can be positioned to align the center of baskets 38 and racks 48 with the center line 82 of inner cavity 32. This configuration provides for an even air gap between baskets 38 and racks 48 and the surfaces of inner cavity 32.

Referring now to FIGS. 1 and 12, a plurality of support arms 84 are fastened or welded to the outer surface of lower body portion 26. Support arms are positioned to rest on frame 14 to support body 12 of grill 10. This feature allows body 12 to be lifted out of frame 14 Without the need for tools. The easy removal of body 12 allows for easy cleaning of grill 10 and its components and should replacement parts be required, this feature allows for easy replacement of such parts, such as replacing frame 14. Moreover, removal of body 12 allows for convenient access to body 12 and its components for cleaning and replacement of parts.

While an illustrative embodiment of the invention has been described, various modifications will be obvious to those skilled in the art. Such modifications are within the spirit and scope of the present invention which is limited and defined only by the appended claims.

What is claimed is:

1. A grilling system comprising:

a) an elongated grill body having an octagonal shape with substantially equivalent sides and angles, said grill body having a pair of symmetrical body portions, said body portions comprising an upper body portion and a lower body portion, said body portions being pivotally mounted with respect to each other, defining an inner cavity having two opposing ends;

b) a pair of baskets being configured, dimensioned and positioned to receive a plurality of charcoal briquets for burning, said baskets being supported at the ends of said inner cavity by a frame; and c) a plurality of food supporting racks being configured, dimensioned and positioned to receive food products for cooking and said racks being supported by said frame in between said baskets;

d) an air introduction system mounted on said upper body portion for introducing outside air into and horizontally across said inner cavity.

2. A grill system as in claim 1, further comprising a receiving pan, said pan being removably mounted to said lower body portion and is configured, dimensioned and positioned to receive grease droppings from said food.

\* \* \* \* \*